UNITED STATES PATENT OFFICE.

ROBERT E. MADISON AND FRANCIS M. MADISON, OF CORNING, IOWA.

IMPROVEMENT IN HOG-CHOLERA COMPOUNDS.

Specification forming part of Letters Patent No. 192,590, dated July 3, 1877; application filed April 11, 1877.

*To all whom it may concern:*

Be it known that we, ROBERT E. MADISON and FRANCIS M. MADISON, both of Corning, in the county of Adams and State of Iowa, have invented a certain new and Improved Medical Compound for the Treatment of Hog-Cholera, of which the following is a specification:

This invention consists in the combination, in certain specified proportions and manner, of a number of medical ingredients to form a medical compound to be administered to animals for the treatment of the disease known as "hog-cholera."

In carrying our invention into practice we prefer to proceed as follows: We take of arnica-blooms, ten parts; blood-root, ten parts; black snake-root, ten parts; rhubarb, ten parts; asafetida, thirty-two parts; saltpeter, thirty-two parts; mandrake-root, four parts; chloride of lime, thirty-two parts. These ingredients are placed in a suitable vessel containing about ten hundred and twenty-four parts of water, and the whole boiled until the mixture is reduced to one-half its former bulk. The active elements of each are by that time extracted and thoroughly incorporated together. Then, while the liquid is still warm, it is strained, and we add thereto of digitalis (fox-glove) root, two parts; balsam of copaiva, two parts; sweet spirits of niter, ten parts; anise-seed oil, two parts; santonine, ten parts.

The whole of the materials are then thoroughly mixed together in any suitable manner, and the compound is ready for administration to animals, which may be done by drenching, admixture with the food, or in any other way, as found most convenient.

The compound above described has on trial been found very efficacious, hogs suffering from the cholera being thoroughly cured in a short time after a proper administration of the medicine.

We have found a dose of one table-spoonful three times a day prove very efficacious in ordinary cases.

Having thus described our invention, the following is what we claim as new and desire to secure by Letters Patent:

The medical compound for the treatment of hog-cholera herein described, composed of arnica-blooms, blood-root, black snake-root, rhubarb, asafetida, saltpeter, mandrake-root, chloride of lime, digitalis (fox-glove) root, balsam of copaiva, sweet spirits of niter, anise-seed oil, santonine, and water, incorporated together in about the proportions and in the manner substantially as set forth.

R. E. MADISON.
F. M. MADISON.

Witnesses:
W. B. ANDERSON,
A. H. GAY.